US009749819B2

(12) United States Patent
Sun et al.

(10) Patent No.: US 9,749,819 B2
(45) Date of Patent: Aug. 29, 2017

(54) NON-ORTHOGONAL COMMUNICATION METHOD IN WIRELESS COMMUNICATION SYSTEM, AND ENB AND USER EQUIPMENT THEREOF

(71) Applicant: Samsung Electronics Co., Ltd., Gyeonggi-do (KR)

(72) Inventors: Pengfei Sun, Beijing (CN); Bin Yu, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 14/574,182

(22) Filed: Dec. 17, 2014

(65) Prior Publication Data

US 2015/0171947 A1 Jun. 18, 2015

(30) Foreign Application Priority Data

Dec. 17, 2013 (CN) .......................... 2013 1 0693144

(51) Int. Cl.
*H04W 4/00* (2009.01)
*H04W 4/08* (2009.01)
*H04B 7/022* (2017.01)
*H04B 7/06* (2006.01)
*H04J 11/00* (2006.01)

(52) U.S. Cl.
CPC ............... *H04W 4/08* (2013.01); *H04B 7/022* (2013.01); *H04B 7/0619* (2013.01); *H04J 11/004* (2013.01)

(58) Field of Classification Search
USPC .......................... 370/329, 330, 331, 338, 333
See application file for complete search history.

(56) References Cited

U.S. PATENT DOCUMENTS

| 2003/0174675 A1* | 9/2003 | Willenegger .......... H04B 7/022 370/335 |
| 2009/0010234 A1* | 1/2009 | Li .......................... H04W 40/02 370/338 |
| 2011/0200135 A1* | 8/2011 | Sorrentino ............. H04B 7/063 375/295 |
| 2012/0106346 A1* | 5/2012 | Aguirre ................. H04W 28/08 370/237 |

* cited by examiner

*Primary Examiner* — Zewdu A Beyen

(57) ABSTRACT

The present disclosure provides a method for performing non-orthogonal communication by a terminal in a wireless communication system, the method including: monitoring scheduling signaling; receiving a multi-layer signal in non-orthogonal transmission according to the monitored scheduling signaling and demodulating the multi-layer signal if non-orthogonal transmission exists; and calculating and feeding back channel state information applied to the non-orthogonal transmission.

27 Claims, 4 Drawing Sheets

NON-ORTHOGONAL COMMUNICATION METHOD IN WIRELESS COMMUNICATION SYSTEM, AND ENB AND USER EQUIPMENT THEREOF

CROSS-REFERENCE TO RELATED APPLICATION(S) AND CLAIM OF PRIORITY

The present application is related to and claims the benefit under 35 U.S.C. §119(a) of a Chinese patent application filed on Dec. 17, 2013 in the Patent Office of the People's Republic of China and assigned Serial No. 201310693144.5, the entire disclosure of which is incorporated hereby incorporated by reference.

TECHNICAL FIELD

The present disclosure relates to a field of wireless communication technologies, and more particularly, to a non-orthogonal communication method, an Evolved Node B (eNB) and a User Equipment (UE)(or terminal).

BACKGROUND

In a radio communication system, radio spectrum resources may be divided into multiple sub-bands and the multiple sub-bands may be multiplexed. According to a division mode of the spectrum resources, multiplexing technologies may include time-domain multiplexing, frequency-domain multiplexing, space-domain multiplexing, code-domain multiplexing and amplitude-domain multiplexing, etc. A multiplexed transmission may include: orthogonal multiplexed transmission and non-orthogonal multiplexed transmission.

The orthogonal multiplexed transmission allows that signals may be transmitted on the multiple sub-bands in a non-interference mode. A receiver may demodulate a signal carried by each sub-band through independent processing, which means that a complexity degree of the receiver is low. Therefore, the orthogonal multiplexing, such as the time-domain orthogonal multiplexing and the frequency-domain orthogonal multiplexing is widely used in various standards of a communication system. If the multiple sub-bands multiplexed in the communication system are allocated to different users, different multiple access technologies, such as a Time Division Multiple Access (TDMA) technology, a Frequency Division Multiple Access (FDMA) technology and a Code Division Multiple Access (CDMA) technology may be used.

In a Long Term Evolution (LTE) system corresponding to an Evolved Universal Terrestrial Radio Access (E-UTRA) protocol made by the 3GPP (3rd Generation Partnership Project), the Orthogonal Frequency Division Multiplexing (OFDM) technology and Orthogonal Frequency Division Multiple Access (OFDMA) technology are used in a Downlink Link (DL). In the downlink link, since there is an orthogonal relationship between the sub-bands, signals transmitted to multiple user equipment (UEs) from the eNB may be multiplexed in the frequency domain. Thus, in the LTE system, each UE may only need to demodulate a signal on a sub-band allocated to the UE and need not to pay attention to the interference from other UEs. The low complexity degree of the receiver and high frequency utilization rate may enable efficient use of communication resources in the LTE system.

However, according to the research of an information theory, the maximum channel capacity cannot be obtained with an orthogonal multiple access scheme in a fading channel. Signals of multiple users may be superimposed together in an amplitude domain with a non-orthogonal multiple access scheme. Therefore, a multi-user gain may be obtained among users with relatively large channel gain differences and total throughput of the communication system may be increased. As spectrum resources of the communication system are increasingly scarce and demand for radio communication services rapidly grows, the non-orthogonal transmission technology, in which the signals of multiple users are superimposed in the amplitude domain, is introduced into the communication system, which may provide the future communication system with higher throughout. Hereinafter, transmission that uses an orthogonal multiplexing (access) scheme is called orthogonal transmission, and transmission that uses a non-orthogonal multiplexing (access) scheme is called non-orthogonal transmission. Signals of multiple users (or UEs) superimposed together in the amplitude domain in the non-orthogonal transmission are called multi-layer signals.

In the non-orthogonal transmission, the eNB may superimpose multi-layer signal amplitudes together and send the superimposed multi-layer signals to one or multiple UEs. A UE may take signals of other user layers as noises and demodulate a signal of the UE's layer. Other UEs may need to demodulate the signals of other layers superimposed on the UE's layer, delete the demodulated signals of other layers from a received signal with the well-known Successive Interference Cancellation (SIC) receiver and demodulate the signal of the UE's layer.

FIG. 1 illustrates a wireless communication system, in which DL signals of UEs are superimposed. DL signals 11, 13 transmitted from an eNB 111 to UEs 101, 103 may be superimposed. The DL signal 11 transmitted to the UE A 101 is represented by signal A 11, and the DL signal 13 to the UE B 103 is represented by signal B 13. The signals A and B 11 and 13 are examples of the multi-layer signals.

FIG. 2 illustrates how to receive signals in the wireless communication system of FIG. 1.

Referring to FIG. 2, UE A 101 receives and demodulates the signal A 11 in operation 201. UE B 103 receives and demodulates the signal A 11 in operation 203, re-establishes the signals A 11 in operation 205, deletes the signal A 11 from a signal received though an SIC receiver in operation 207, and demodulates the signal B 13 in operation 209.

However, in order to make the non-orthogonal transmission sharing the amplitude domain effectively apply to a communication system, a serial of technical challenges may need to be overcome. Otherwise, advantages of the non-orthogonal transmission can only stop at the theoretical analysis. Hereinafter, the non-orthogonal transmission is to be understood as sharing the amplitude domain. Some technology details for implementing the non-orthogonal transmission may be described hereinafter.

1) If an eNB schedules non-orthogonal transmission, one or some UEs may first need to demodulate data of other users. Otherwise, excessive interference may result in that the UEs cannot demodulate signals belonging to them. Therefore, the eNB may need to inform the UE how to demodulate signals of the other users. Since the eNB may switch between non-orthogonal transmission scheduling and conventional orthogonal transmission scheduling, the UE may need to be dynamically informed of the non-orthogonal scheduling 2) If a UE demodulates a multi-layer signal, the UE may need to know amplitude information and phase information of a channel on which the multi-layer signal is transmitted.

Although a conventional reference signal may provide the phase information of the channel, the UE cannot accurately estimate amplitude information of each signal. Thus, with design of the reference signal in the orthogonal transmission, the UE cannot accurately demodulate the multi-layer signal in the non-orthogonal transmission.

3) In the orthogonal transmission, the UE may assume that the signal from an eNB may only include the signal belonging to the UE. Then, the UE may calculate channel state information according to measured background noises and interference from the other cells and feed back the channel state information to the eNB. However, non-orthogonal transmission in which signals of multiple UEs are superimposed in the amplitude domain means that a receiving signal of the UE is affected by extra interference and the interference only occurs if the receiving signal arrives, resulting in that it is very difficult to predict the interference and feed back a piece of accurate channel state information. It is difficult for the conventional design and technology to effectively support non-orthogonal transmission.

For instance, it may be assumed that an eNB may allocate half power to UE A and adopt Quadrature Phase Shift Keying (QPSK) modulation. Furthermore, the eNB may allocate the other half of the power to a UE B and adopt 16 Quadrature Amplitude Modulation (QAM). Moreover, it is assumed that the eNB may send a reference signal with full power. In this case, the UE B first needs to demodulate data of the UE A and delete the UE A's interference from a received signal. The UE B obtains channel information according to the reference signal, where is the amplitude information of the channel, is the phase information of the channel. Based on the phase information of the channel, the UE B may demodulate the signal of the UE A and delete the UE A's interference from the received signal. However, since the UE B cannot obtain the amplitude information of the 16QAM in the non-orthogonal transmission and cannot demodulate the UE A's signal.

For another example, it may be assumed that the UE A recommends using the 16QAM transmission mode in channel state feedback according to the background noises and an interference situation of an adjacent cell. However, if the eNB superimposes a low-power signal on a 16QAM signal, the interference received by the UE A may likely be the interference from the superimposed low-power signal, other than the interference from the background noises or the adjacent cell. Therefore, in this case, the UE A may fail to perform the demodulation due to extra interference.

Therefore, a need exists for a scheme for effectively applying the non-orthogonal transmission to the DL link in the radio communication system.

SUMMARY

The present disclosure provides an efficient non-orthogonal communication method and apparatus in a wireless communication system.

The present disclosure also provides a non-orthogonal communication method and apparatus for improving throughput and reducing delay in a wireless communication system.

In accordance with an aspect of the present disclosure, a method for performing non-orthogonal communication by a terminal in a wireless communication system is provided. The method including: monitoring scheduling signaling; receiving a multi-layer signal in non-orthogonal transmission according to the monitored scheduling signaling and demodulating the multi-layer signal if non-orthogonal transmission exists; and calculating and feeding back channel state information applied to the non-orthogonal transmission.

The scheduling signaling may include at least one of scheduling signaling belonging to respective terminals, and scheduling signaling of a multicast group or a broadcast group.

The scheduling signaling may be received from at least one of a local cell and a neighboring cell.

Receiving the multi-layer signal in the non-orthogonal transmission may include: receiving the multi-layer signal in the non-orthogonal transmission at same time, same frequency and same space resources.

Demodulating the multi-layer signal may include obtaining a signal level of the multi-layer signal and a reference signal corresponding to a signal of each layer; and demodulating the multi-layer signal in sequence according to the signal level and the reference signal corresponding to the signal of each layer.

Monitoring the scheduling signaling may include: determining whether the non-orthogonal transmission exists based on the scheduling signaling.

Monitoring the scheduling signaling may include: monitoring at least two pieces of scheduling signaling; and obtaining resource allocation information in the at least two pieces of scheduling signaling and determining that the non-orthogonal transmission exists if resources of another terminal, multicast group or broadcast group are overlapping to those allocated to itself.

Monitoring the scheduling signaling may include determining that the non-orthogonal transmission exists if the scheduling signaling in a specific format is detected.

The scheduling signaling in the specific format may include scrambling code or ID corresponding to the specific format.

The method may further include obtaining information of the multi-layer signal from the scheduling signaling in the specific format, wherein the information of the multi-layer signal may include at least one of: non-orthogonal resource allocation information of each terminal, a modulation mode, a channel coding mode, an antenna pre-coding mode, a demodulation mode, an antenna port, a reference signal transmission mode or a multi-antenna transmission mode and a signal level.

The method may further include adjusting, for the signal of each layer, amplitude of estimated channel information or a signal of a layer according to the power difference corresponding to the signal of the layer, and performing channel equalization and data demodulation.

The reference signal corresponding to the signal of each layer may be different, and the method may further include demodulating the multi-layer signal in sequence according to a reference signal corresponding to the signal of each layer.

The reference signal corresponding to the signal of each layer is different and transmission power of a signal of at least one layer is different from that of a reference signal corresponding to the signal of the at least one layer, and the method may further include obtaining estimated channel information according to a reference signal corresponding to a signal of each layer, adjusting amplitude of each estimated channel information or the signal of the layer according to the power difference corresponding to the signal of the layer and performing channel equalization and data demodulation.

The method may further include receiving and demodulating a signal of a single layer if the non-orthogonal transmission does not exist.

Calculating and feeding back channel state information applied to the non-orthogonal transmission may include: measuring a channel state of the non-orthogonal transmission and obtaining channel state information applied to the non-orthogonal transmission; and reporting the channel state information applied to the non-orthogonal transmission.

The method may further include reporting channel state information applied to orthogonal transmission.

The method may further include: reporting the difference between the channel state information applied to the non-orthogonal transmission and the channel state information applied to orthogonal transmission.

Measuring the channel state of the non-orthogonal transmission may include obtaining a configured power ratio and a signal level and measuring channel information based on a condition "power of an antenna port is allocated to a non-orthogonal signal superimposed on a useful signal and the useful signal according to a power ratio, the non-orthogonal signal and the useful signal are superimposed according to the signal level".

Measuring the channel state of the non-orthogonal transmission may include configuring information for indicating that the terminal measures a reference signal of a specific antenna port and measuring channel information based on a condition "a non-orthogonal signal is superimposed on a signal of another layer according to an indicated signal level, power of the non-orthogonal signal is same as that of a reference signal or difference of the power of the non-orthogonal signal and that of the reference signal is an indicated value".

In accordance with another aspect of the present disclosure, a terminal for performing non-orthogonal communication in a wireless communication system is provided. The terminal includes a transceiver for transmitting and/or receiving wireless signals; and a controller for monitoring scheduling signaling; receiving a non-orthogonal multi-layer signal according the monitored scheduling signaling and demodulate the multi-layer signal if non-orthogonal transmission exists; and receive and demodulate a single-layer signal if the non-orthogonal transmission does not exists; and calculating and feeding back channel state information applied to the non-orthogonal transmission.

In accordance with another aspect of the present disclosure, a method for performing non-orthogonal communication by an eNB in a wireless communication system is provided. The method includes: transmitting scheduling signaling of non-orthogonal transmission; performing the non-orthogonal transmission and transmitting a reference signal and configuration information of the reference signal of the non-orthogonal transmission; and configuring a channel state feedback mode of the terminal and receiving channel state information applied to the non-orthogonal transmission from the terminal.

Transmitting the scheduling signaling may include transmitting at least two pieces of scheduling signaling.

One of the at least two pieces of scheduling signaling may indicate at least one of occurrence of the non-orthogonal transmission, an ID of another terminal of the non-orthogonal transmission or ID of a multicast group or a broadcast group and a signal level of the non-orthogonal transmission.

Transmitting the scheduling signaling of the non-orthogonal transmission may include configuring the terminal to monitor the scheduling signaling, configuring the terminal to monitor the at least two pieces of scheduling signaling, and configuring the IDs of the at least two pieces of scheduling signaling and the signal level for the terminal, wherein resources of the at least two pieces of scheduling signaling are overlapping or partially overlapping.

Configuring the terminal may include configuring the terminal to monitor scheduling signaling in an ordinary format and scheduling signaling in a specific format.

The method may further include transmitting the scheduling signaling in the specific format using length, scrambling code or ID which is different from that of the scheduling signaling in the ordinary format.

The scheduling signaling in the specific format may carry relevant information of a multi-layer signal of the non-orthogonal transmission, and the relevant information of the multi-layer signal of the non-orthogonal transmission may include at least one of: non-orthogonal resource allocation information of each terminal, a modulation mode, a channel coding mode, an antenna pre-coding mode, a demodulation mode, an antenna port, a reference signal transmission mode or a multi-antenna transmission mode and a signal level.

The configuration information of the reference signal may include at least a piece of information indicating that a multi-layer signal of the non-orthogonal transmission uses a same reference signal, information indicating power difference between transmission power of a signal of each layer and that of a reference signal corresponding to the signal of the each layer; information indicating a corresponding relationship between multi-layer signals of the non-orthogonal transmission and multiple reference signals; information indicating the corresponding relationship between the multi-layer signals of the non-orthogonal transmission and the multiple reference signals and information indicating power difference between transmission power of the signal of each layer and that of the reference signal corresponding to the signal of each layer.

The multiple reference signals may be orthogonally multiplexed or quasi-orthogonally multiplexed.

Performing the non-orthogonal transmission may include transmitting a multi-layer signal at same time, using a same frequency and same space resources.

The multi-layer signal may include a unicast signal and a multicast signal or broadcast signal.

The multi-layer signal may be sent from a same cell or a different cell.

The multi-layer signal may be transmitted to a same terminal or at least two terminals.

In accordance with another aspect of the present disclosure, an eNB for performing non-orthogonal communication in a wireless communication system is provided. The eNB includes: a transceiver for transmitting and/or receiving wireless signals; and a controller for transmitting configuration information, the configuration information is to configure a terminal to monitor scheduling signaling of non-orthogonal transmission and transmit the corresponding scheduling signaling, performing the non-orthogonal transmission, transmitting a reference signal and a reference signal configuration of the non-orthogonal transmission; configuring a channel state feedback mode of the terminal and receiving channel state information applied to the non-orthogonal transmission from the terminal.

Other aspects, advantages, and salient features of the present disclosure will become apparent to those skilled in the art from the following detailed description, which, taken in conjunction with the annexed drawings, discloses exemplary embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
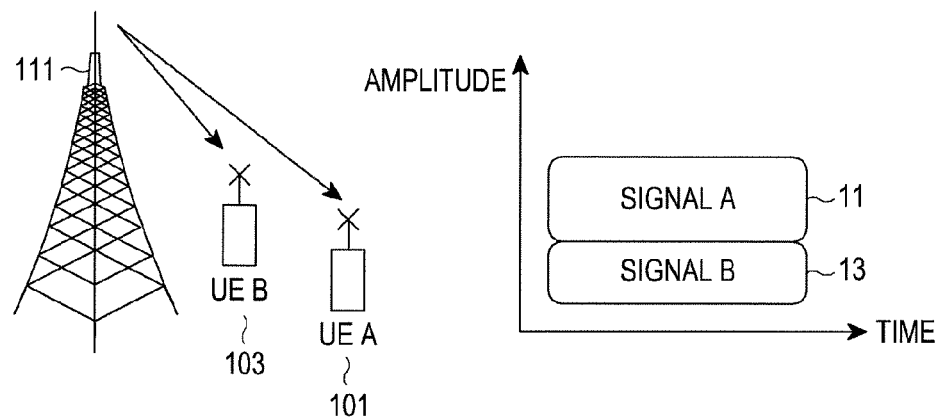
FIG. 1 illustrates an occasion where downlink (DL) signals of User Equipment (UEs) are superimposed in a wireless communication system.
Figure 2:
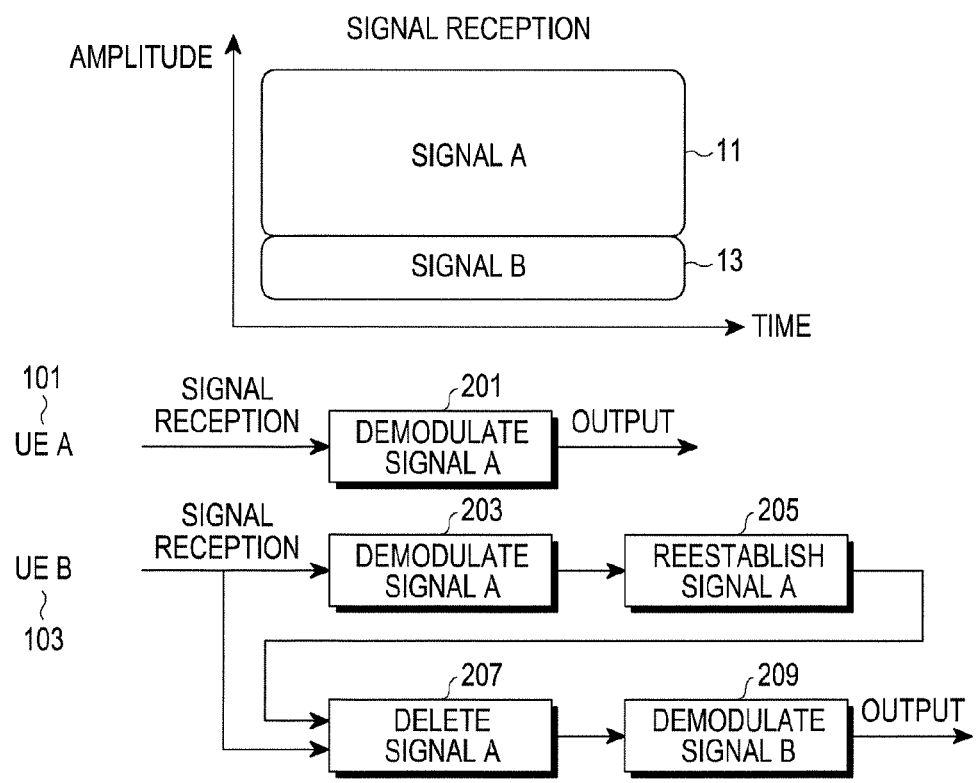
FIG. 2 illustrates how to receive signals in the wireless communication system of FIG. 1.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description provides various embodiments of the present disclosure with reference to the accompanying drawings. The following description includes various specific details to assist in that understanding but these are to be regarded as merely exemplary and various modifications may be made to the embodiments.

The embodiments of the disclosure may, however, be embodied in many different forms and should not be construed as limited to the embodiments set forth herein; rather, these embodiments are provided so that this disclosure will be thorough and complete, and will fully convey the scope of the embodiments of the disclosure to those skilled in the art. Like numbers refer to like elements throughout.

The terms "comprise" and/or "comprising" as herein used specify the presence of disclosed functions, operations, or components, but do not preclude the presence or addition of one or more other functions, operations, or components. It will be further understood that the terms "comprise" and/or "have," if used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For example, "A or B" may include A, or include B, or include both A and B.

Ordinal numbers as used herein, such as "first", "second", etc., may modify various components of various embodiments, but do not limit those components. For example, these terms do not limit order and/or importance of corresponding elements, components, regions, layers and/or sections. These terms are only used to distinguish one element, component, region, layer or section from another region, layer or section. For example, a first user device and a second user device refers to two different user devices. Thus, a first element, component, region, layer or section discussed below could be termed a second element, component, region, layer or section without departing from the teachings of the embodiments of the present disclosure.

If the term "connected" or "coupled" is used, a component may be directly connected or coupled to another component or may be indirectly connected or coupled to another component via another new component. However, if a component is said to be "directly connected" or "directly coupled" to another component, it should be interpreted as literally as stated.

The terminology used herein is for the purpose of describing particular embodiments only and is not intended to be limiting of the embodiments of the present disclosure.

It is to be understood that the singular forms "a," "an," and "the" include plural references unless the context clearly dictates otherwise.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to enhance network throughput of the communication system and reduce data delay resulting from scheduling, the present disclosure may provide an effectively and feasible non-orthogonal communication technical scheme. In the present disclosure, by introducing a new scheduling instruction mode, reference signal design and channel state information feedback scheme, the non-orthogonal transmission may be reliably and effectively applied to the DL link of the wireless communication system.

A non-orthogonal communication method sharing an amplitude domain provided by the present disclosure may mainly include following aspects.

1) Monitoring of scheduling signaling may be configured. The scheduling signaling indicates whether non-orthogonal transmission exists. A UE(or terminal) may receive scheduling signaling from an eNB and make a determination as to whether non-orthogonal transmission may be transmitted to the UE.

2) A reference signal transmission mode may be configured and a corresponding reference signal may be transmitted. The UE may obtain necessary channel information for demodulating a data signal according to the configuration information.

3) A channel state feedback mode may be configured. The UE may select a channel state measurement method according to the configuration information and report a measurement result. An eNB may select an optimal transmission parameter in the non-orthogonal transmission according to reported information.

Figure 3:
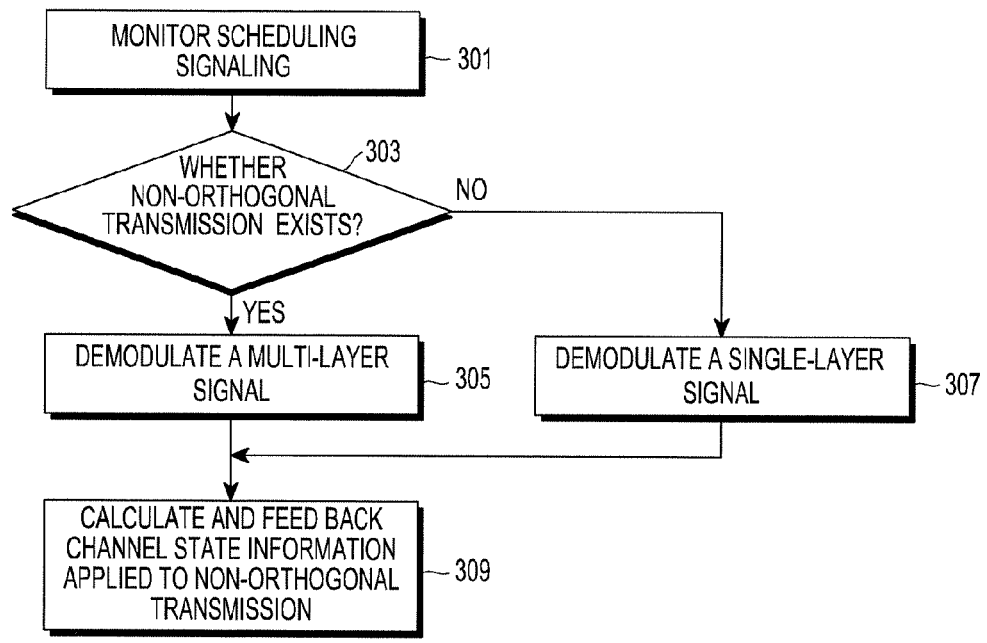
FIG. 3 is a flowchart illustrating a non-orthogonal communication method in a wireless communication system in accordance with an example of the present disclosure.

FIG. 3 is a flowchart illustrating a non-orthogonal communication method in a wireless communication system in accordance with an example of the present disclosure. The method may be applied to a UE side.

Referring to FIG. 3, in operation 301, a UE may monitors scheduling signaling transmitted from an eNB. In operation 310, the UE may obtain first configuration information for monitoring the scheduling signaling and the UE may monitor the scheduling signaling according to the first configuration information. The first configuration information may be used for informing the UE that the scheduling signaling may need to be simultaneously detected. For instance, the first configuration information may indicate that the UE may need to simultaneously monitor multiple pieces of scheduling signaling and the scheduling signaling may be sent from a same cell or multiple cells. Alternatively, one piece of scheduling signaling may be monitored and the scheduling signaling may be sent from this cell or an adjacent cell. In another embodiment, the first configuration information may indicate that the UE may monitor a piece of scheduling signaling of a special format. In an example of the present disclosure, the scheduling signaling may include scheduling signaling belonging to the UE or another UE, or scheduling signaling of a multicast group or broadcast group.

The first configuration information may include at least a piece of information, such as Identifiers (ID)s of multiple UEs, IDs of multiple cells, a format of special scheduling signaling, IDs of multiple broadcast services and a signal level indicator.

In operation 303, the UE determines whether the non-orthogonal transmission may exist according to the monitored scheduling signaling.

In order to implement the monitoring of the scheduling signaling, several preferred implementation modes may be provided hereinafter in the present disclosure.

The first implementation mode of the scheduling signaling may be that an instruction may be carried in the scheduling signaling transmitted to the UE. For instance, one bit of instruction or scrambling code ID may be added in the scheduling signaling. The one bit of instruction or scrambling code ID may indicate whether the non-orthogonal transmission may exist. In the first implementation mode, the UE may check the scheduling signaling transmitted to the UE first and determine whether the non-orthogonal transmission may exist according to the instruction in the scheduling signaling. The scheduling signaling may carry at least one of an ID of another UE, an ID of a multi-cast group or a broadcast group of a superimposed signal and carry a signal level. The UE may detect the scheduling signaling of the UE, multi-cast group or broadcast group corresponding to the ID according to the ID. If the UE does not detect the scheduling signaling transmitted to it, the UE may not perform other detection.

The second implementation mode of the scheduling signaling may be that the UE may monitor at least two pieces of scheduling signaling. That is, the UE may monitor the scheduling signaling transmitted to the UE and scheduling signaling transmitted to other UEs configured by the first configuration information and obtain resource allocation information from the scheduling signaling. If resources allocated to the other UEs, multi-cast group and broadcast group are overlapping to those allocated to the UE, the UE may be determined that the non-orthogonal transmission may exist.

The third implementation mode of the scheduling signaling may be that the UE may simultaneously monitor a piece of scheduling signaling in an ordinary format and a piece of scheduling signaling in a specific format. The specific format may be implemented via different signaling length, scrambling codes or different IDs, etc. If the scheduling signaling in the specific format may be detected, it may be considered that the non-orthogonal transmission may exist. The scheduling signaling in the specific format may include relevant information of a signal of each layer in a multi-layer signal. Therefore, multiple UEs may be configured to detect the same scheduling signaling using the specific format. The information of the multi-layer signal may be obtained from the scheduling signaling in the specific format. The information relevant to a signal of each layer may include at least one of non-orthogonal resource allocation information of each UE, a modulation mode, a channel coding mode, an antenna pre-coding mode, a decoding mode, an antenna port, a reference signal transmission mode, multi-antenna transmission mode and a signal level.

If it is determined in operation 303 that the non-orthogonal signal transmission exists, the UE receives a multi-layer signal transmitted in the non-orthogonal transmission and demodulates the multi-layer signal in operation 305. If it is determined in operation 303 that the non-orthogonal signal transmission does not exist, the UE receives a single-layer signal and demodulates the single-layer signal in operation 307.

Here, the method for receiving the multi-layer signal in the non-orthogonal transmission may include receiving the multi-layer signal in the non-orthogonal transmission at the same time, same frequency and space resources.

With the instruction of the first configuration information or the scheduling signaling, the UE may obtain the signal level, first demodulate an upper-layer signal and re-establish the upper-layer signal. The upper-layer signal may be a signal which may have relatively high power and may be separately demodulated without relying on interference cancellation. The re-established signal may not only include a data signal which may be originally encoded, but also include influence of the transmission channel on the data signal. The re-established signal may be deleted from the received signal. The above demodulation and deletion process may be repeated according to the signal level, until the signal belonging to the UE may be demodulated. The signal level may be obtained according to the instruction in the scheduling signaling and may also be semi-statically configured via high-layer signaling of the eNB.

Furthermore, the method for demodulating the multi-layer signal may include: obtaining a signal level of the multi-layer signal and a reference signal corresponding to each layer and demodulating the multi-layer signal in sequence according to the signal level and the reference signal corresponding to the signal of each layer. That is, if an eNB transmits a multi-layer signal, a corresponding reference signal may need to be transmitted to help the UE to estimate the channel and demodulate the multi-layer signal. Therefore, an example of the present disclosure may provide the following two modes for configuring the reference signal and transmitting the reference signal. Second configuration information for the transmission mode of the reference signal may be provided to the UE.

The first mode of the reference signal transmission may be that the eNB may use one reference signal. In this case, the reference signal corresponding to the signal of each layer may be the same reference signal. An absolute channel between the eNB and the UE may be estimated with the reference signal. At the same time, the eNB may inform the UE power ratio, i.e., power difference between the signal of each layer and the reference signal, occupied by the signal of each layer. Then, if the user demodulates the signal of a level, amplitude adjustment may be performed for the received signal according to the corresponding power difference or amplitude adjustment may be performed for estimated signal information according to the corresponding power difference. Furthermore, channel equalization and data demodulation may be performed. Similarly, if a signal of a layer is re-established, the amplitude adjustment may be performed for the estimated channel according to the corresponding power difference and the estimated channel after the amplitude adjustment may be multiplied by the re-established modulation signal. It may be avoided that a new reference signal may be introduced and only an extra power difference instruction may be needed. The power difference instruction may be instructed with physical layer scheduling signaling or semi-statically instructed with high-layer signaling.

In the second mode of the reference signal transmission, reference signal for the signal of each layer and the reference signal of each layer may be responsible for demodulating the signal of the corresponding layer. That is, the reference signal corresponding to the signal of each layer may be different. If a UE needs to demodulate the signal of a layer, channel estimation may be independently made using the corresponding reference signal. The reference signal may use transmission power, which may be the same as that of a data signal and the UE may not need to do any adjustment. Since a signal of a layer may use very low transmission power, in order to ensure accuracy of the channel estimation, the eNB may transmit a corresponding reference signal with the transmission power which may be larger than that of the data signal. Then, the eNB should indicate the difference between the transmission power of the signal of a layer and that of the reference signal corresponding to the signal of the layer.

If signals of different layers use different multi-antenna transmission modes, the above mode for using the same reference signal may not work and a mode for using multiple reference signals may need to be used.

The first and second modes of the reference signal transmission may be separately used or may be used in combination.

There may be an orthogonal or quasi-orthogonal relationship between the reference signals of different layers and the data signal, so that the accuracy of the channel estimation may be enhanced.

Different reference signals may be orthogonally multiplexed or quasi-orthogonally multiplexed.

In operation 309, the UE calculates channel state information in the non-orthogonal transmission and feeds back the channel state information to the eNB. Third configuration information for feedback transmission of the channel state information may be provided to the UE.

For example, the eNB may configure a channel state calculation mode and transmit auxiliary information, such as a power ratio and signal level to the UE. The UE may calculate the channel state based on an assumption that the subsequent transmission may be the non-orthogonal transmission. According to a conventional scheme, the eNB may transmit the reference signal to the UE in measuring the chancel state. The interference of the multi-layer signal with a useful signal may be obtained according to the power ratio, signal level and received reference signal. The optimal modulation mode, channel coding, antenna pre-coding and a multi-antenna transmission mode may be calculated according to the interference of the multi-layer signal with the useful signal, local noises and other interference situations. In another embodiment, the eNB may make a configuration to make the UE to measure a special reference signal to obtain an interference situation of the non-orthogonal transmission. For instance, if the unicast data and multicast-broadcast data of the user is transmitted with the non-orthogonal transmission, the UE may measure the reference signal of a broadcast signal to obtain the interference situation.

Since the eNB may switch between the orthogonal transmission and the non-orthogonal transmission, the UE may report two groups of feedback information which correspond to the orthogonal transmission and the non-orthogonal transmission. Similarly to the conventional feedback scheme, non-orthogonal transmission-based feedback may be triggered based on a period or the eNB. If the two groups of feedback information need to be simultaneously transmitted, the UE may report the channel state information applied to the non-orthogonal transmission and the channel state information applied to the orthogonal transmission separately or in combination. The channel state information applied to the non-orthogonal transmission and the channel state information applied to the orthogonal transmission may be separately reported in different periods or the same period. If the channel state information applied to the non-orthogonal transmission and the channel state information applied to the orthogonal transmission is reported in combination, the channel state information applied to the orthogonal transmission may be reported and the difference between the channel state information applied to the non-orthogonal transmission and the channel state information applied to the orthogonal transmission may be reported.

Furthermore, the third configuration information may indicate whether the UE may use a group of channel state measurement modes which may be dedicated to non-orthogonal transmission. Based on a configured measurement mode, the UE may feed back a group of channel state information which may be different from that used in the orthogonal transmission.

The third configuration information may be further used for indicating using a dedicated measurement mode and indicating a power ratio and signal level. The UE may measure the channel information according to a condition "Power from an antenna port may be respectively allocated to a non-orthogonal signal superimposed on a useful signal and the useful signal according to a power ratio, the non-orthogonal signal and useful signal may be superimposed according to the signal level".

The third configuration information may be further used for indicating using a dedicated measurement mode and instructing the UE to measure the reference signal of a specific antenna port. The UE may measure the channel information according to a condition "A non-orthogonal signal may be superimposed on a signal of another layer according to the signal level. The power of the reference signal may be the same as that of the reference signal or the difference of the power of the non-orthogonal signal and that of the reference signal may be an indicated value".

The third configuration information may be further used for indicating using an ordinary measurement mode and the signal level. The UE may measure the channel state according to the orthogonal transmission and estimate the channel state if the non-orthogonal transmission is used.

The above embodiment may merely describe how the UE may demodulate the multi-layer signal in the non-orthogonal transmission. With different examples, the technical scheme provided by the present disclosure may be used in multiple different scenarios to enhance overall performances of the system. Various scenarios to which the present disclosure may be applied will now be described with four embodiments with reference to FIGS. 4 to 6.

In one example embodiment:

An application scenario of this embodiment may be the non-orthogonal transmission among multiple UEs in a same cell. The eNB may select a pair of UEs or multiple pairs of UEs. A criteria used by the eNB for selecting the UEs may be that difference between channel fading of the pair of UEs and difference between channel fading of each pair of the multiple pairs of the UEs is relatively large. If multiple users may have requirements of DL signal transmission, the eNB may schedule the non-orthogonal transmission. Since the channel and data arrival is dynamic, the eNB may dynamically choose to switch to the conventional orthogonal transmission to enhance the flexibility of the scheduling. According to the technical scheme provided by the present disclosure, we can see that the eNB may implement the dynamic switching via transmitting the configuration information and transmitting the corresponding scheduling signaling For instance, the eNB may configure that the UE may monitor the scheduling signaling in a special format, such as the scheduling signaling with a larger size. If the eNB schedules the non-orthogonal transmission for the UE A and UE B as shown in FIG. 1, the eNB may transmit scheduling signaling in the special format and encapsulate scheduling information of the UE A and the UE B in the scheduling signaling. The user A and the user B only may find the scheduling signaling in the special format via blind detection in this timeslot and obtain the non-orthogonal transmission. If the eNB schedules the orthogonal transmission once, the scheduling signaling in the conventional format may be transmitted to a UE. Similarly, the dynamic switching may be implemented by monitoring the above other scheduling signal.

In another example embodiment:

The application scenario of this embodiment may be that the non-orthogonal transmission may be performed for a unicast signal and one of a multicast signal and a broadcast signal (called multicast-broadcast signal hereinafter for short). The UE may receive the signaling of the configuration information to obtain whether the unicast signal of the UE may perform the non-orthogonal transmission with the multicast-broadcast data. According to the scheduling signaling, the UE may determine whether the unicast data of the UE may be superimposed on the multicast-broadcast data. If the UE belongs to a multicast service group or a broadcast service group, the UE may always demodulate a multicast-broadcast service, re-establish and delete the multicast-broadcast data and demodulate the unicast data. The scheduling signaling and the multicast-broadcast data may be simultaneously transmitted. The UE may always demodulate and delete the multicast-broadcast data and detect whether there may be the scheduling signaling. The transmission mode that the multicast-broadcast and the unicast may share the amplitude domain may be applied to UEs outside of a multicast-broadcast group. The eNB may need to transmit relevant configuration information of the multicast-broadcast to the UE in advance.

Figure 4:
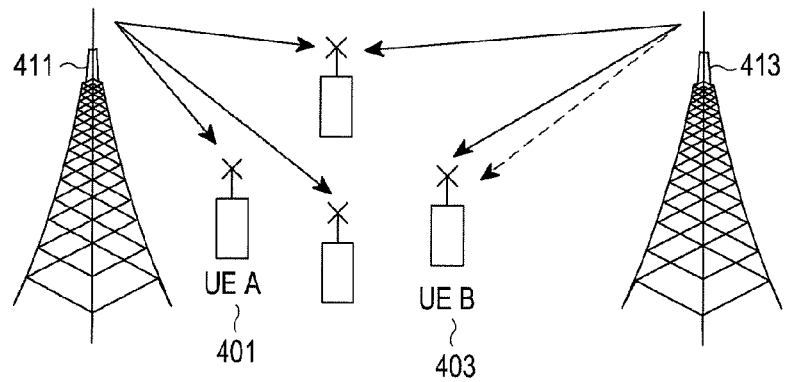
FIG. 4 illustrates a non-orthogonal transmission of a broadcast signal and a unicast signal in accordance with an example of the present disclosure.
Figure 4:
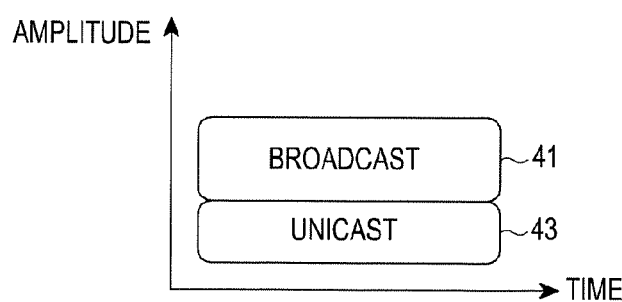

In the embodiment two, multiple cells may simultaneously transmit broadcast signals and form a Single Frequency Network (SFN). Then, each cell may superimpose the unicast data of the UEs in this cell on the broadcast signal. This application may transmit the unicast data with a multicast-broadcast timeslot, which may significantly enhance spectrum efficiency of the system. Since the scheduling signaling of the multicast-broadcast data may always be transmitted to multiple UEs, this application method may avoid cause too much scheduling signaling overhead. FIG. 4 illustrates non-orthogonal transmission of a broadcast signal and a unicast signal in accordance with an example of the present disclosure, which may show a scenario that a unicast signal 43 and a broadcast signal 41 may be simultaneously transmitted from eNBs 411, 413. In FIG. 4, a solid line may represent the broadcast signal 41 received by the UE A 401 and a dotted line may represent the unicast signal 43 which may be received by the UE A 401. The demodulation mode of the UE A 401 may adopt a method similar to the method shown in FIG. 2.

In another example embodiment:

In an application scenario of this embodiment, in multiple small cells, the non-orthogonal transmission may be applied among multiple cells to control the interference among the cells. For instance, a UE A may receive a signal from a cell #a. Since the UE A may be located at a cross-area of the cell #a and the cell #b, a DL signal of the cell #b may cause strong interference on the user #A. With the method provided by the present disclosure, the UE A may monitor the scheduling signaling from the cell #b with the configuration information. If a UE determines that the non-orthogonal transmission may be performed, the UE may first demodulate the signal of the cell #b and re-demodulate the signal of the cell #a after deleting the re-established signal. Then, the signal of the cell #b may be data transmitted to the UE B of this cell or may be the data transmitted to the UE A.

Figure 5A:
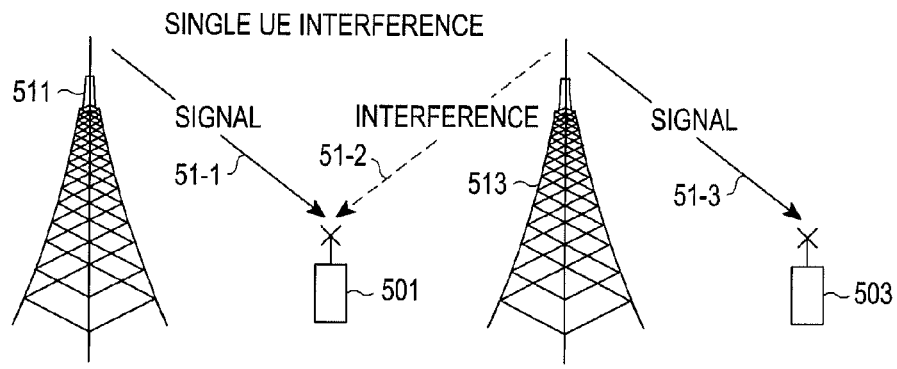
FIGS. 5A to 5C illustrate interference management performed with the non-orthogonal transmission in accordance with an example of the present disclosure.
Figure 5B:
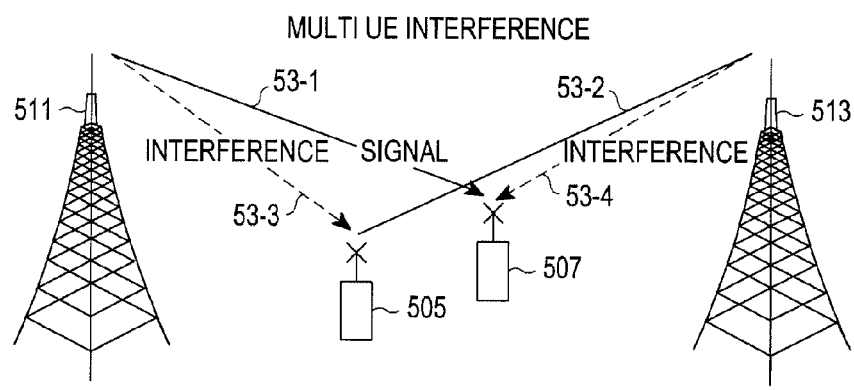
Figure 5C:
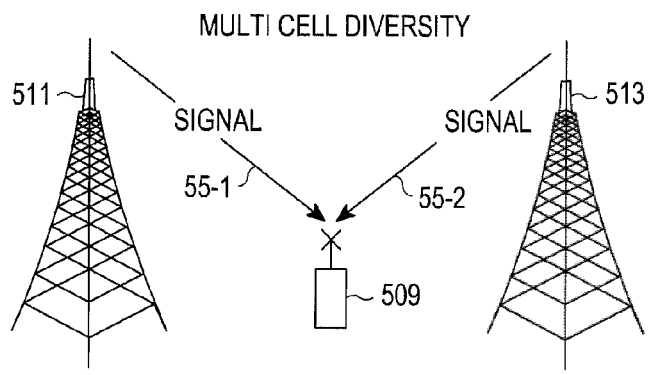

FIGS. 5A to 5C illustrate interference management performed with the non-orthogonal transmission in accordance with an example of the present disclosure. DL signals 51-1~51-3, 53-1~53-4, 55-1~55-2 transmitted from cells 511, 513 may be ordinary signals or interference signals to the UEs 501, 503, 507, 509. FIG. 5A shows an example of single UE interference, FIG. 5B shows an example of multi-UE interference, and FIG. 5C shows an example of multi-cell diversity.

As shown in FIGS. 5A to 5C, the interference management of a single UE or multiple UEs may be implemented by applying the non-orthogonal transmission to multiple small cells. If the UE demodulates and deletes the DL signal from a neighboring cell, the UE may obtain a pure signal similar to the signal without inter-cell interference. This may mean that the throughput of the whole system may be effectively enhanced. If multiple cells transmit the same signal, diversity transmission of a single user may be implemented. Different from the conventional multi-antenna diversity transmission, a single eNB of a cell may separately schedule and code data of the user, the data may be transmitted to the user in a non-orthogonal transmission mode. Here, the transmission reliability of a single UE may be enhanced. Therefore, with different application methods, different objectives may be implemented in multiple small cell scenarios with the technical scheme of the present disclosure.

In still yet another example embodiment:

In a network controlled scenario that a UE may directly connect with another UE and communicate with the UE, the eNB may keep controlling the UE via the DL and allow that the UE may directly communicate with another UE. The eNB may allow the communication between the UEs by allocating dedicated resources. The resources and the DL resources of the eNB may be multiplexed together in a time division mode. However, with the non-orthogonal transmission mode of the present disclosure, the UE directly-connected transmission of the UE and the DL transmission of the eNB may be simultaneously performed.

Figure 6:
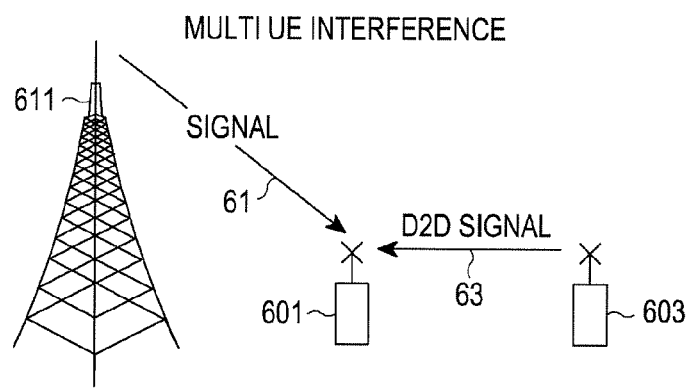
FIG. 6 illustrates a non-orthogonal transmission between a cell and UEs in accordance with an example of the present disclosure.

FIG. 6 illustrates non-orthogonal transmission between a cell and UEs in accordance with an example of the present disclosure.

Referring to FIG. 6, UE 601 may simultaneously receive the DL data 61 from the eNB 611 and receive D2D signal 63 from a directly-connected UE 603. This may mean that the eNB 611 may keep controlling the UE 601 and the data transmission between the UEs may not be affected. Since the UE directly-connected transmission may require a good channel state, the UE directly-connected transmission and the eNB DL transmission may form a group of transmission pairs with relatively large channel fading. That is, the application scenario of FIG. 6 may enhance the spectrum efficiency of the whole communication system and enhance control delay of the eNB on the UE directly-connected transmission.

According to the embodiments of the present disclosure, corresponding to the above method applied to the UE, the present disclosure may further provide a method applied to an eNB. The method may include:

configuring a UE to monitor scheduling signaling of non-orthogonal transmission and transmitting the scheduling signaling, performing the non-orthogonal transmission and transmitting a reference signal and a reference signal configuration information of the non-orthogonal transmission; and configuring a channel state feedback mode of the UE and receiving channel state information applied to the non-orthogonal transmission from the UE.

According to an embodiment of the present disclosure, the method for transmitting the scheduling signaling includes: transmitting at least two pieces of scheduling signaling by one eNB or transmitting at least two pieces of scheduling signaling by at least two eNBs.

According to an example, one of the at least two pieces of scheduling signaling may indicate occurrence of the non-orthogonal transmission, indicate an ID of another UE of the non-orthogonal transmission or ID of a multicast group or a broadcast group and indicate a signal level of the non-orthogonal transmission.

According to another example, a method for configuring the UE to monitor the scheduling signaling of the non-orthogonal transmission may include: configuring the UE to monitor at least two pieces of scheduling signaling and configuring the IDs of the at least two pieces of scheduling signaling and the signal level for the UE. Resources of the at least two pieces of scheduling signaling are overlapping or partially overlapping.

According to another example, a method for configuring the UE to monitor the scheduling signaling of the non-orthogonal transmission may include: configuring the UE to monitor scheduling signaling in an ordinary format and scheduling signaling in a specific format. The method may further include: transmitting the scheduling signaling in the specific format using length, scrambling code or ID which is different from that of the scheduling signaling in the ordinary format.

According to an embodiment of the present disclosure, the scheduling signaling in the specific format may carry relevant information of a multi-layer signal of the non-orthogonal transmission, and the relevant information of the multi-layer signal of the non-orthogonal transmission may include at least one of: non-orthogonal resource allocation information of each UE, a modulation mode, a channel coding mode, an antenna pre-coding mode, a demodulation mode, an antenna port, a reference signal transmission mode or a multi-antenna transmission mode and a signal level.

According to an embodiment of the present disclosure, the reference signal configuration may indicate that a multi-layer signal of the non-orthogonal transmission may use a same reference signal and indicate power difference between transmission power of a signal of each layer and that of a reference signal corresponding to the signal of the each layer.

Alternatively, the reference signal configuration information may indicate a corresponding relationship between multi-layer signals of the non-orthogonal transmission and multiple reference signals.

Alternatively, the reference signal configuration information may indicate the corresponding relationship between the multi-layer signals of the non-orthogonal transmission and the multiple reference signals and indicate power difference between transmission power of the signal of each layer and that of the reference signal corresponding to the signal of each layer.

Multiple reference signals are orthogonally multiplexed or quasi-orthogonally multiplexed.

According to an embodiment of the present disclosure, a method for performing the non-orthogonal transmission may include: transmitting a multi-layer signal at same time, using a same frequency and same space resources. The multi-layer signal may include: a unicast signal, multicast signal or broadcast signal. The multi-layer signal may be sent from a same cell or a different cell. The multi-layer signal may be transmitted to a same UE or at least two UEs.

Figure 7:
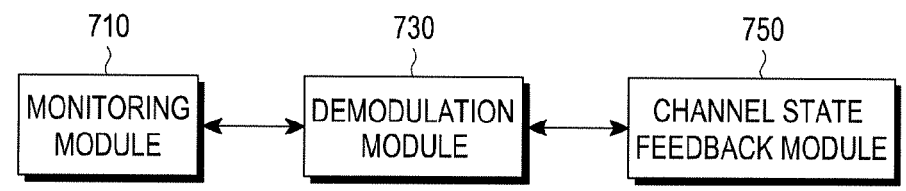
FIG. 7 is a block diagram illustrating structure of a UE in accordance with an example of the present disclosure.

Corresponding to the above method applied to the UE, the present disclosure may provide a UE shown in FIG. 7. The UE may include: a monitoring module 710, a demodulation module 730 and a channel state feedback module 750. In another implementation, the UE may include a transceiver for transmitting/receiving wireless signals, the monitoring module 710, the demodulation module 730, and a controller for controlling operation of the monitoring module 710, demodulation module 730, and channel state feedback module 750.

The monitoring module 710 may be to monitor scheduling signaling.

The demodulation module 730 may be to receive a multi-layer signal in non-orthogonal transmission according the monitored scheduling signaling and demodulate the multi-layer signal if non-orthogonal transmission exists; and receive and demodulate a single-layer signal if the non-orthogonal transmission does not exists.

The channel state feedback module 750 may be to calculate and feed back channel state information applied to the non-orthogonal transmission.

Figure 8:
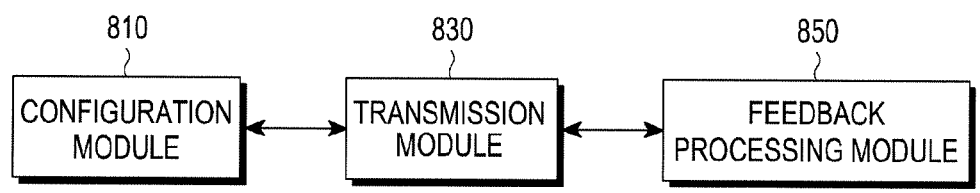
FIG. 8 is a block diagram illustrating structure of an eNB in accordance with an example of the present disclosure.

Corresponding to the above method applied to the eNB, the present disclosure may provide an eNB shown in FIG. 8. The eNB may include: a configuration module 810, a transmission module 830 and a feedback processing module 850.

The configuration module 810 may be to transmit configuration information. The configuration information is to configure a UE to monitor scheduling signaling of non-orthogonal transmission and transmit the corresponding scheduling signaling.

The transmission module 830 may be to perform non-orthogonal transmission and transmit a reference signal and a reference signal configuration of the non-orthogonal transmission.

The feedback processing module 850 may be to configure a channel state feedback mode of the UE and receive channel state information applied to the non-orthogonal transmission from the UE.

It may be seen from the above technical scheme that the present disclosure may provide a non-orthogonal communication technology scheme. The non-orthogonal transmission may be reliably and effectively applied to the DL link of the radio communication system, the throughput of the radio communication system may be enhanced and delay of a single UE may be reduced by introducing a new scheduling instruction mode, reference signal design and channel state information feedback scheme.

The foregoing only describes examples of the present disclosure. The protection scope of the present disclosure, however, is not limited to the above description. Any change or substitution, easily occurring to those skilled in the art, should be covered by the protection scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a terminal in a wireless communication system, the method comprising:
   monitoring a scheduling signal;
   receiving a multi-layer signal in which signals of terminals are superposed in an amplitude domain based on the scheduling signal;
   determining whether a non-orthogonal transmission exists based on the scheduling signal;
   demodulating the multi-layer signal if the non-orthogonal transmission exits; and
   transmitting channel state information applied to non-orthogonal transmission,
   wherein the determining of whether the non-orthogonal transmission exists comprises:
      obtaining resource allocation information in at least two scheduling signals, and
      determining that the non-orthogonal transmission exists if resources allocated to another terminal different from the terminal, a multicast group, or a broadcast group are overlapped with resources allocated to the terminal.

2. The method according to claim 1, wherein the scheduling signal comprises at least one of a scheduling signal for each of the terminals, and a scheduling signal for a multicast group or a broadcast group.

3. The method according to claim 2, wherein the scheduling signal is received from at least one of a serving cell and a neighboring cell.

4. The method according to claim 1, wherein the receiving of the multi-layer signal comprise:
   receiving the multi-layer signal at same time, a same frequency, and a same space resource.

5. The method according to claim 1, wherein the demodulating of the multi-layer signal comprises:
   obtaining a signal level and a reference signal for each of the signals; and
   demodulating each of the signals based on the signal level and the reference signal for each of the signals.

6. The method according to claim 5, further comprising:
   adjusting an amplitude of estimated channel information for each of the signals or each of the signals based on a power difference between each of the signals and a reference signal; and
   performing channel equalization and data demodulation on each of the signals.

7. The method according to claim 5, further comprising:
   demodulating each of the signals based on the reference signal corresponding to each of the signals,
   wherein the reference signals corresponding to the signals are different.

8. The method according to claim 5, further comprising:
   obtaining estimated channel information of each of the signals based on the reference signals corresponding to each of the signals;
   adjusting an amplitude of estimated channel information or each of the signals based on a power difference between each of the signals and the reference signals corresponding to each of the signals; and
   performing channel equalization and data demodulation on each of the signals,
   wherein the reference signals corresponding to the signals are different and power of at least one of the signals is different from power of at least one reference signal corresponding to the at least one of the signals.

9. The method according to claim 1, wherein the determining of whether the non-orthogonal transmission exists comprises:
   determining that the non-orthogonal transmission exists if a format of the scheduling signal is a first format.

10. The method according to claim 9, wherein the scheduling signal of the first format comprises a scrambling code or an identifier (ID) corresponding to the first format.

11. The method according to claim 9, further comprising:
   obtaining information about each of the signals from the scheduling signal of the first format,
   wherein the information about each of the signals comprises at least one of non-orthogonal resource allocation information, a modulation mode, a channel coding mode, an antenna pre-coding mode, a demodulation mode, an antenna port, a reference signal transmission mode, a multi-antenna transmission mode, and a signal level.

12. The method according to claim 1, further comprising:
   receiving and demodulating a signal if the non-orthogonal transmission does not exist,
   wherein the receiving of the multi-layer signal comprises receiving the multi-layer signal if the non-orthogonal transmission exists.

13. The method according to claim 1, wherein the transmitting of the channel state information applied to the non-orthogonal transmission comprises:
measuring a channel state of the non-orthogonal transmission and obtaining channel state information applied to the non-orthogonal transmission; and
transmitting the channel state information applied to the non-orthogonal transmission.

14. The method according to claim 13, wherein measuring the channel state of the non-orthogonal transmission comprises:
obtaining a configured power ratio and a signal level; and
measuring channel information based on a condition where power of an antenna port is allocated to a non-orthogonal signal superposed on a useful signal and the useful signal based on a power ratio, and the non-orthogonal signal and the useful signal are superposed based on the signal level.

15. The method according to, claim 13, wherein measuring the channel state of the non-orthogonal transmission comprises:
configuring information for indicating that the terminal measures a reference signal of a first antenna port; and
measuring channel information based on a condition where a non-orthogonal signal is superposed on a signal of another terminal different from the terminal based on an indicated signal level, power of the non-orthogonal signal is same as power of a reference signal, or a difference of the power of the non-orthogonal signal and the power of the reference signal is an indicated value.

16. The method according to claim 1, further comprising:
transmitting channel state information applied to an orthogonal transmission.

17. The method according to claim 1, further comprising:
transmitting a difference between the channel state information applied to the non-orthogonal transmission and the channel state information applied to an orthogonal transmission.

18. A terminal in a wireless communication system, the terminal comprising:
a controller configured to monitor a scheduling signal and to determine whether a non-orthogonal transmission exists based on the scheduling signal;
a transceiver configured to receive a multi-layer signal in which signals of terminals are superposed in an amplitude domain, and to transmit channel state information applied to non-orthogonal transmission; and
a demodulator configured to demodulate the multi-layer signal if the non-orthogonal transmission exists,
wherein the controller is further configured to obtain resource allocation information in at least two scheduling signals, and to determine that the non-orthogonal transmission exists if resources allocated to another terminal different from the terminal, a multicast group, or a broadcast group are overlapped with resources allocated to the terminal.

19. A method of a base station (BS) in a wireless communication system, the method comprising:
transmitting at least two scheduling signals including resource allocation information, wherein, if a non-orthogonal transmission exists, the resource allocation information indicates that resources allocated to a terminal, a multicast group, or a broadcast group are overlapped with resources allocated to another terminal different from the terminal;
transmitting a multi-layer signal in which signals of terminals are superposed in an amplitude domain, the terminals including the terminal and the other terminal;
transmitting an indication of a signal level and a reference signal for each of the signals of the terminals for demodulation of each of the signals of the terminals; and
receiving channel state information applied to a transmission using non-orthogonal multiplexing from one of the terminals.

20. The method according to claim 19, wherein the scheduling signal comprises at least one of a scheduling signal for each of the terminals, and a scheduling signal for a multicast group or a broadcast group.

21. The method according to claim 19, wherein, if a format of the scheduling signal is a first format, the scheduling signal of the first format includes a scrambling code or an identifier (ID) corresponding to the first format.

22. The method according to claim 19, wherein, if a format of the scheduling signal is a first format, the scheduling signal of the first format includes information about each of the signals, and
wherein the information about each of the signals comprises at least one of non- orthogonal resource allocation information, a modulation mode, a channel coding mode, an antenna pre-coding mode, a demodulation mode, an antenna port, a reference signal transmission mode, a multi-antenna transmission mode, and a signal level.

23. The method according to claim 19, further comprising:
transmitting a reference signal or reference signals of the terminals,
wherein the reference signals of the terminals are different.

24. The method according to claim 19, further comprising:
transmitting a reference signal or reference signals of the terminals,
wherein the reference signals of the terminals are different and power of at least one of the signals is different from power of at least one reference signal corresponding to the at least one of the signals.

25. The method according to claim 24, further comprising receiving channel state information applied to transmission using the orthogonal multiplexing from one of the terminals.

26. The method according to claim 19, further comprising transmitting a signal using orthogonal multiplexing.

27. A base station (BS) in a wireless communication system, the BS comprising:
a transceiver configured:
to transmit at least two scheduling signals including resource allocation information, wherein, if a non-orthogonal transmission exists, the resource allocation information indicates that resources allocated to a terminal, a multicast group, or a broadcast group are overlapped with resources allocated to another terminal different from the terminal,
to transmit a multi-layer signal in which signals of terminals are superposed in an amplitude domain, the terminals including the terminal and the other terminal,
to transmit an indication of a signal level and a reference signal for each of the signals of the terminals for demodulation of each of the signals of the terminals, and to receive channel state information applied to a transmission using non-orthogonal multiplexing from one of the terminals.

\* \* \* \* \*